(12) United States Patent
Gaurav et al.

(10) Patent No.: US 10,579,945 B2
(45) Date of Patent: Mar. 3, 2020

(54) INFORMATION TECHNOLOGY COST CALCULATION IN A SOFTWARE DEFINED DATA CENTER

(71) Applicant: VMWARE, INC., Palo Alto, CA (US)

(72) Inventors: Kumar Gaurav, Bangalore (IN); Hemanth Kumar Pannem, Bangalore (IN); Amarnath Palavalli, Bangalore (IN); Arun Narayanaswamy, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 724 days.

(21) Appl. No.: 14/644,232

(22) Filed: Mar. 11, 2015

(65) Prior Publication Data
US 2016/0203424 A1    Jul. 14, 2016

(30) Foreign Application Priority Data
Jan. 9, 2015 (IN) .............................. 163/CHE/2015

(51) Int. Cl.
*G06Q 10/06* (2012.01)
*H04L 12/24* (2006.01)
*G06F 9/455* (2018.01)

(52) U.S. Cl.
CPC ..... *G06Q 10/0631* (2013.01); *G06F 9/45558* (2013.01); *H04L 41/0806* (2013.01); *H04L 41/5029* (2013.01); *G06F 9/45533* (2013.01); *G06F 2009/45591* (2013.01); *G06F 2009/45595* (2013.01); *H04L 41/5054* (2013.01)

(58) Field of Classification Search
USPC ....................................................... 705/7.12
See application file for complete search history.

(56) References Cited

U.S. PATENT DOCUMENTS

| 2010/0199285 | A1* | 8/2010 | Medovich | ........... G06F 9/45533 718/104 |
| 2011/0077997 | A1* | 3/2011 | Agarwala | .............. G06Q 30/04 705/7.35 |
| 2012/0260248 | A1* | 10/2012 | Katiyar | ............... G06F 9/45533 718/1 |
| 2013/0304903 | A1* | 11/2013 | Mick | ................... H04L 43/0817 709/224 |

OTHER PUBLICATIONS

Hossain et al. (Resource Allocation for Service Composition in Cloud-based Video Surveillance Platform, Published in: 2012 IEEE International Conference on Multimedia and Expo Workshops, pp. 408-412, Date Added to IEEE Xplore: Aug. 16, 2012).*

* cited by examiner

*Primary Examiner* — Brian M Epstein
*Assistant Examiner* — Matthew D Henry
(74) *Attorney, Agent, or Firm* — Thomas | Horstemeyer, LLP (57) ABSTRACT

The present disclosure is related to methods, systems, and machine-readable media for information technology (IT) cost calculation in a software defined data center. A cost of infrastructure IT objects in a software defined data center can be calculated. The infrastructure IT objects can be mapped to an IT service construct over time, during runtime of the infrastructure IT objects. A portion of the cost of the infrastructure IT objects can be allocated to the IT service construct according to the map. A non-infrastructure IT cost can be allocated to the IT service construct. A total cost of the IT service construct can be calculated based on the allocations.

20 Claims, 4 Drawing Sheets

INFORMATION TECHNOLOGY COST CALCULATION IN A SOFTWARE DEFINED DATA CENTER

CROSS-REFERENCE TO RELATED APPLICATION(S)

Benefit is claimed 35 U.S.C. 119(a)-(d) to Foreign application Serial 163/CHE/2015 filed in India entitled "INFORMATION TECHNOLOGY COST CALCULATION IN A SOFTWARE DEFINED DATA CENTER", on Jan. 9, 2015, by VMware, Inc., which is herein incorporated in its entirety by reference for all purposes.

BACKGROUND

A data center is a facility that houses servers, data storage devices, and/or other associated components such as backup power supplies, redundant data communications connections environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications.

DETAILED DESCRIPTION

The term "virtual computing instance" (VCI) covers a range of computing functionality. The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts. VMs, containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads. The term "VCI" covers these examples and combinations of different types of data compute nodes, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Cost allocation, calculation, and/or modeling of IT services can help provide understanding of the financials of a software defined data center. This is relevant to both service providers and enterprises, for example, for enterprises where IT and cloud administrators try to provide public cloud type services and accountability to their internal consumers.

Software defined data centers may include different applications to manage different aspects of the data center. As the number of different applications grows and/or changes, calculating an IT cost, particularly a cost that is relevant to the customer rather than the provider, can be challenging because the interface between the cost application and the growing and/or changing other applications may be out of date. However, according to a number of embodiments of the present disclosure, applications, services, etc., can be added and/or changed in the software defined data center with having to modify a cost application. Some embodiments of the present disclosure include calculating IT cost in an extensible manner to suit a variety of cost allocation desires of a variety of IT services.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
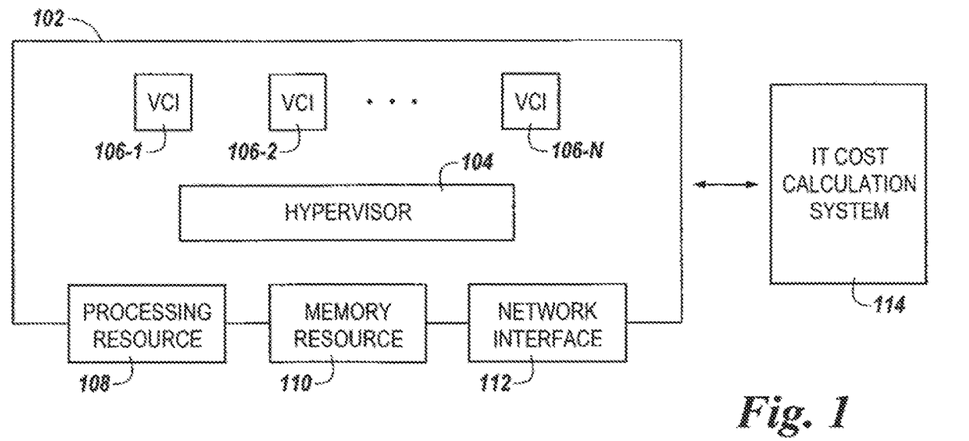
FIG. 1 is a diagram of a host and a system for IT cost calculation according to a number of embodiments of the present disclosure.

FIG. 1 is a diagram of a host and a system for IT cost calculation according to a number of embodiments of the present disclosure. The system can include a host 102 with processing resources 108 (e.g. a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The Vas can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a VO cost allocation system 114. An example of the VCI cost allocation system is illustrated and described in more detail with respect to FIG. 2. In some embodiments, the cost allocation system 114 can be a server, such as a web server.

Figure 2:
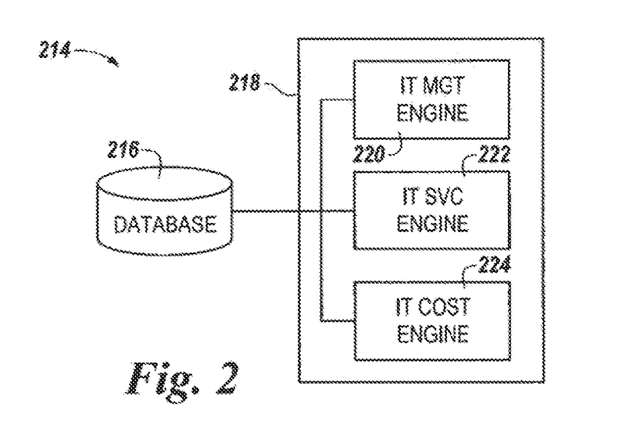
FIG. 2 is a diagram of a system for IT cost calculation according to a number of embodiments of the present disclosure.

FIG. 2 is a diagram of a system for IT cost calculation according to a number of embodiments of the present disclosure. The system 214 can include a database 216, a subsystem 218, and/or a number of engines, for example IT management "MGT" engine 220. IT service "SVC" engine 222, and/or IT cost engine 224, and can be in communication with the database 216 via a communication link. The system 214 can include additional or fewer engines than illustrated to perform the various functions described herein. The system can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the IT management engine 220 can include a combination of hardware and program instructions that is configured to provision a plurality of VCIs using a pool of IT resources in a software defined data center. The pool of IT resources can include physical IT resources used in the software defined data center, for example, compute, storage, and network physical resources such as processors, memory, and network appliances. The IT management engine 220 can provision a VCI with resources to enable functionality of the Va., for example according to performance metrics of the VCI, according to a service level agreement for provisioning the VCI according to a tier of service of the VCI, and the like.

In some embodiments, the IT service engine 222 can include a combination of hardware and program instructions that is configured to provision a plurality of IT service constructs using, the plurality of VCIs that were provisioned by the IT management engine 220. An IT service construct is a service provided by the software defined data center (e.g., as opposed to an infrastructure IT object in the software defined data center, such as a VCI, a virtual disk, or a virtual network appliance, among others). Some examples of such services are a virtual desktop, user accounts, network security, an application (e.g., a word processing program), and an enterprise application (e.g., a business management application that includes multiple virtual servers and an entire virtual network between them with security services), among others. The IT service engine 222 can be configured to manage any of the IT services.

In some embodiments, the IT cost engine 224 can include a combination of hardware and program instructions that is configured to receive over time, from the IT service engine 222, definitions of relationships between the plurality of IT service constructs and the plurality of VCIs. The relationships between the IT service constructs and the VCIs can change over time. As the software defined data center is operational, individual VCIs, individual IT service constructs, and/or the relationships there between can change. The individual VCIs can change, for example, in terms of which resources they are provisioned with, which IT service constructs make use of the VCIs, etc. The individual IT service constructs can change, for example, in terms of which VCIs they are provisioned with, which users they are serving, etc. The relationships between the IT service constructs and the VCIs can change as described above, in terms of which VCIs are being used to provision a particular IT service construct. An individual VCI can be used to provision more than one IT service construct, and those numbers can change during operation of the software defined data center. An individual IT service construct can be provisioned by more than one VCI, and those numbers can change during operation of the software defined data center.

Advantageously, according to a number of embodiments of the present disclosure, the IT service engine 222 can be configured to send the definitions of relationships to the IT cost engine 224 during runtime of the infrastructure IT objects. Infrastructure IT objects are virtualized resources in the software defined data center such as VCIs, virtual disks, or virtual network appliances, among others. This can allow the IT cost engine 224 to receive the relationship information without having to fetch it, which could require revised programming as the various engines and/or applications in the software defined data center change or grow over time.

Some examples of definitions of relationships include "used-by/uses" and "member-of/includes-member."

The IT cost engine 224 can include a combination of hardware and program instructions that is configured to map over time the plurality of VCIs to the plurality of IT service constructs based on the definitions. As described herein, such mapping over time can create a service graph. The IT cost engine 224 can be configured to calculate a cost over time of a particular IT service construct based on the map (or service graph). For example, in association with the calculation of cost, the IT cost engine can be configured to allocate a cost of the pool of infrastructure resources to the plurality of VCIs. The details of allocations of infrastructure and non-infrastructure IT costs are described in more detail herein.

Figure 3:
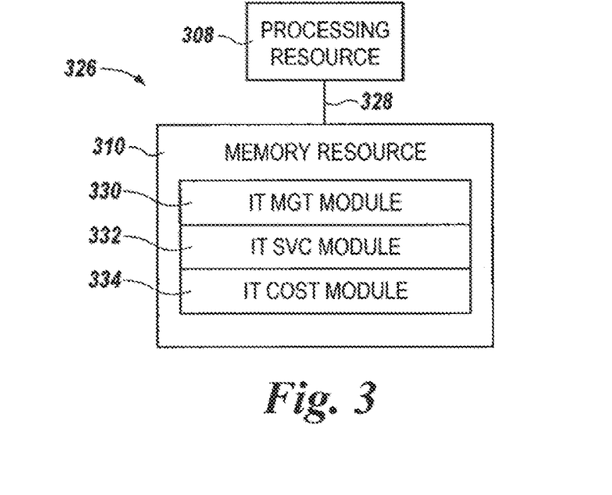
FIG. 3 is a diagram of a machine for IT cost calculation according to a number of embodiments of the present disclosure.

FIG. 3 is a diagram of a machine for IT cost calculation according to a number of embodiments of the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resources 308 and a number of memory resources 310, such as a machine-readable medium (MRM) or other memory resources 310, The memory resources 310 can be internal and/or external to the machine 326 (e.g., the machine 326 can include internal memory resources and have access to external memory resources). In some embodiments, the machine 326 can be a VCI, The program instructions (e.g., machine-readable instructions (MRI)) can include instructions stored on the MRM to implement a particular function (e.g., an action such as calculating a total cost of an IT service construct based on cost allocations). The set of MRI can be executable by one or more of the processing resources 308. The memory resources 310 can be coupled to the machine 326 in a wired and/or wireless manner. For example, the memory resources 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among, others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 328. The communication path 328 can be local or remote to the machine 326, Examples of a local communication path 328 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof the communication path 328 can be such that the memory resources 310 are remote from the processing resources 308, such as in a network connection between the memory resources 310 and the processing resources 308. That is, the communication path 328 can be a network connection. Examples of such a network connection can include a local area network (LAN), wide area network (WAN), personal area network (PAN), and the Internet, among others.

As shown FIG. 3, the MRI stored in the memory resources 310 can be segmented into a number of modules 330, 332, 334 that when executed by the processing resources 308 can perform a number of functions. As used herein a module includes a set of instructions included to perform a particular task or action. The number of modules 330, 332, 334 can be sub-modules of other modules. For example, the IT service module 332 can be a sub-module of the IT management module 330 and/or can be contained within a single module. Furthermore, the number of modules 330, 332, 334 can comprise individual modules separate and distinct from one another. Examples are not limited to the specific modules 330, 332, 334 illustrated in FIG. 3.

Each of the number of modules 330, 332, 334 can include program instructions and/or a combination of hardware and program instructions that, when executed by a processing resource 308, can function as a corresponding engine as described with respect to FIG. 2. For example, the IT management module 330 can include program instructions and/or a combination of hardware and program instructions that, when executed by a processing resource 308, can function as the IT management engine 220, the IT service module 332 can include program instructions and/or a combination of hardware and program instructions that, when executed by a processing resource 308, can function as the IT service engine 222, and/or the IT cost module 334 can include program instructions and/or a combination of hardware and program instructions that, when executed by a processing resource 308, can function as the IT cost engine 224.

For example, the machine 326 can include an IT cost module 334, which can include instructions to calculate a cost of infrastructure IT objects in a software defined data center. The IT cost module 334 can include instructions to map the infrastructure IT objects to an IT service construct over time, during runtime of the infrastructure IT objects. In some embodiments, the IT cost module 334 can include instructions to map the infrastructure IT objects to non-infrastructure IT objects. The non-infrastructure IT objects can include the IT service construct and at least one other non-infrastructure IT object (e.g., selected from the group including a user and a business unit). Depending on the specifics of a particular software defined data center, the IT cost module 334 can map the infrastructure IT objects to the IT service construct and to a different IT service construct over time (e.g., where more than one ET service construct share the use of the same infrastructure IT objects over time). Different IT service constructs could both use the same infrastructure IT objects at the same time or at different times within a common cost allocation cycle (an amount of time over which costs are to be allocated). The IT cost module can include instructions to allocate a different portion of the cost of the infrastructure objects to the different IT service construct according, to the map.

The IT cost module 334 can include instructions to allocate a portion of the cost of the infrastructure IT objects to the IT service construct according to the map. For example, the map can indicate which of the infrastructure IT objects are used by the IT service construct over time and therefore the cost of which infrastructure IT objects should be allocated (at least in part) to the IT service construct. The portion of the cost allocated can depend on relative usage, relative numbers of IT service constructs that use the infrastructure IT objects, or other cost allocation metrics, but the map indicates which IT service constructs are charged for the cost of the infrastructure IT objects.

The IT cost module 334 can include instructions to allocate a non-infrastructure IT cost to the IT service construct. A non-infrastructure IT cost is the cost of non-infrastructure IT objects. A non-infrastructure IT object can be a service construct, such as a virtual desktop, or an object that is represented in the software defined data center, but is not actually a part of the software defined data center, such as a user, a business unit, or the like. Examples of non-infrastructure IT costs include labor, licensing, network security costs, auditing costs, service charges, etc. In some embodiments, the IT cost module 334 can include instructions to allocate the non-infrastructure IT costs from the different IT service construct (e.g., from a virtual desktop) to the IT service construct (e.g., to a user of the virtual desktop). For example, the non infrastructure IT cost can be a service charge for the virtual desktop that can be allocated to the virtual desktop and from the virtual desktop to the user of the virtual desktop.

The IT cost module 334 can calculate a total cost of the IT service construct based on the allocations (of the portion of the cost of the infrastructure IT objects and the non-infrastructure IT cost). Such embodiments can be beneficial in providing a customer with an accurate snapshot of their total cost for the service they use, as opposed to a collection of independent costs for infrastructure IT objects and service charges for non-infrastructure IT objects calculated by the different applications that manage those various portions of the software defined data center. Further, as described herein, the cost can be calculated in an extensible manner to allow for changing dynamics both of the operation of the objects in the data center and the applications that manage them without also changing the functionality of the IT cost module 334 that provides such calculations (e.g., in run-time).

Figure 4:
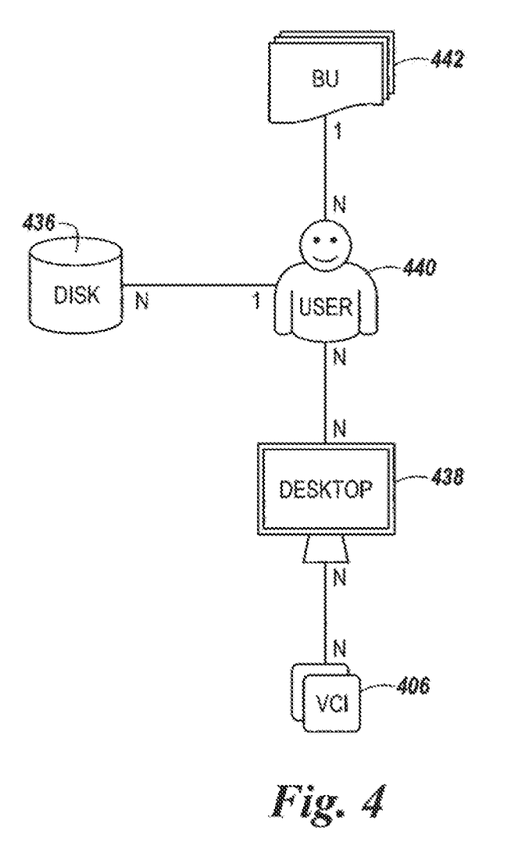
FIG. 4 illustrates a model of relationships between infrastructure and non-infrastructure IT objects according to a number of embodiments of the present disclosure.

FIG. 4 illustrates a model of relationships between infrastructure and non-infrastructure II objects according to a number of embodiments of the present disclosure. A particular software defined data center may include an IT management application, an IT service application, and an IT cost application. The IT management application may have the details of the VCIs 406 in the software defined data center their configuration, and their utilization of IT resources, such as computing, storage, and network, the IT service application can be a virtual desktop provisioning and management application, for example, not to the exclusion of other IT service applications, the IT service application can service the virtual desktops 438 out of VCIs 406 provisioned and managed by the IT management application. The IT cost application may understand the expenses incurred by the IT department, understand the IT management application's objects and constructs, and do cost allocation to the VCIs 406 in a fair and justified proportion. However, these three disparate applications may not be able to provide the cost of a virtual desktop 438, According to a number of embodiments of the present disclosure, the IT cost application can be provided with the underlying data to support such a cost calculation without having to understand the constructs and abstractions of the IT service application and retrofit that back to the IT management application hierarchy of objects and constructs, which would make IT application integration in a software defined data center slow and costly.

Rather than allowing the IT cost application to consume the APIs exposed by the IT service application (which may be just one of many applications to be integrated for cost calculation purposes) to fetch the data, understand the semantics of the objects and/or hierarchy and generate a IT service application contextual cost report, a number of embodiments of the present disclosure provides an extensible approach to IT cost calculation.

According to the present disclosure, the IT management application can be analogous to the IT management engine 220 illustrated in FIG. 2 and/or IT management module 330 illustrated in FIG. 3, the IT service application can be analogous to the IT service engine 222 illustrated in FIG. 2 and/or the IT service module 332 illustrated in FIG. 3. The IT cost application can be analogous to the IT cost engine 224 illustrated in FIG. 2 and/or the IT cost module 334 illustrated in FIG. 3. The IT cost application can receive an API query (e.g., from the IT service application). The query can provide information to the IT cost application that allows the IT cost application to know what objects (infrastructure and non infrastructure objects) are involved in the software defined data center and what the relationships between the objects are. The query can include information that allows the IT cost application to express the objects and relationships as a graph in the IT cost application's own context. Thus, the query does not expose the model of the source of the query, rather the query only exposes the data (e.g., numbers) that allow the IT cost application to build a model in its own context at runtime.

The model illustrated in FIG. 4 is an example of what an IT cost application could build based on data received in an API query to represent the objects and relationships generally. The objects include VCIs 406, virtual disks 436, virtual desktops 438, users 440, and business units 442. The term "virtual disk" represents the memory resources used by an object and is indicative of an amount of memory used rather than an indication of one or more physical memory devices. As illustrated, the users 440 have an N-to-one relationship with business units 442. That is, more than one user can be a member of one business unit, but one user can be a member of one business unit. The users 440 have a one-to-N relationship with virtual disks 436. That is, one virtual disk can be used by one user 110, but one user 440 can use more than one virtual disk 436. The users 440 have an N-to-N relationship with the virtual desktops 438. That is, more than one user 440 can use one virtual desktop 438 and one user 440 can use more than one virtual desktop 438. The virtual desktops 438 have an N-to-N relationship with the VCIs 406. That is, one virtual desktop 438 can use more than one VCI 406 and one VCI 406 can be used by more than one virtual desktop 438.

The IT cost application can map the objects and relationships over time based on API queries received over time. The information in the API queries that allows the IT cost application to create a map is its own context are called definitions (e.g., definitions of non infrastructure IT objects, definitions of relationships between the plurality of non-infrastructure IT objects and infrastructure IT objects in the software defined data center). The definitions can also include properties of the objects. Examples of properties include service tier, quality of service, and resource utilization, among others. Such mapping over time is referred to as a service graph. Furthermore, such an approach does not require a hard coded model of the software defined data center.

Figure 5:
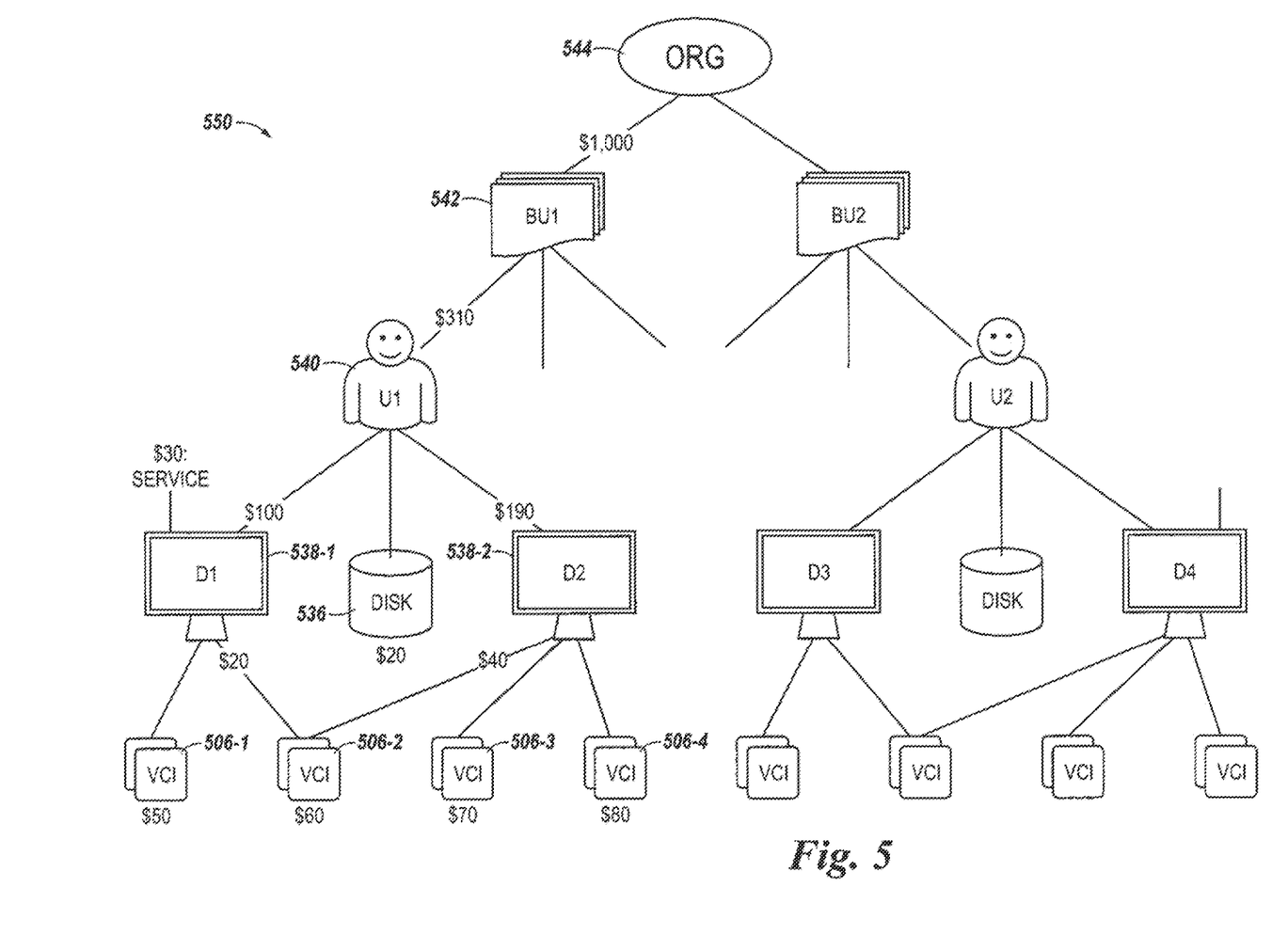
FIG. 5 illustrates a service graph according to a number of embodiments of the present disclosure.

FIG. 5 illustrates a service graph 550 according to a number of embodiments of the present disclosure. Because the mapping changes over time, the result is a service graph 550 rather than a tree. The leaves of the service graph 550 are infrastructure IT objects (in this case VCIs and virtual disks, although other infrastructure IT objects could be included, such as virtual network appliances). The root of the service graph 550, in this example, is an organization 544. Below the organization 544 are illustrated two business units with two users below the business units. Below the users are four virtual desktops and two disks. Below the virtual desktops are eight VCIs. The service graph 550, as illustrated is incomplete and intended only as an example for explanation. For example, the business units have lines coming off them that could indicate the presence of other users not specifically illustrated.

The IT cost application can allocate costs using the service graph 550. Infrastructure IT costs can be summed bottom-up on the service graph 550. In some instances, a particular infrastructure IT cost may be allocated according to its utilization. For example, if VCI 506-2 was used by virtual desktop 538-1 for the first 10 days of a month and then by virtual desktop 538-2 for the last 20 days of the month, a first portion of the total cost ($60) could be allocated up from the VCI 506-2 to the virtual desktop 538-1 ($20) and a second portion of the cost could be allocated up to the virtual desktop 538-2 ($40). This is illustrated in FIG. 5. As is also illustrated, the cost of VCI 506-3 ($70) and the cost of VCI 506-4, which are only used by virtual desktop 538-2 are allocated in full thereto. Thus, the cost allocated to virtual desktop 538-2 is a total of $190 for the stun of the infrastructure IT costs from VCI 506-3 ($70), VCI 506-4 ($80) and the second portion of the cost of VCI 506-2 ($40) for a total of $190.

Likewise, for virtual desktop 538-1, the total cost of VCI 506-1 ($50) is allocated thereto as well as the first portion of the infrastructure IT cost of VCI 506-2 ($20). However, virtual desktop 538-1 is illustrated with a non-infrastructure IT cost ($30) being allocated directly thereto (e.g., a service charge). Therefore, the virtual desktop 538-1 is illustrated with a total allocated cost of $100.

The costs allocated to the virtual desktop 538-1 ($100) are allocated up to the user 540 and the costs allocated to the virtual desktop 538-2 ($190) are allocated up to the user 540. Furthermore, the infrastructure IT cost of the virtual disk 536 ($20) is allocated up to the user 540 for a total cost allocated to user 540 of $310. Although not illustrated specifically, these costs can continue to be allocated up the service graph 550.

Non-infrastructure IT costs (e.g., the $30 service charge illustrated in association with the virtual desktop 538-1) can be summed bottom-up on the service graph 550. However, in some instances it may be appropriate to allocate this cost top-down on the service graph 550. For example, and not specifically illustrated, a non-infrastructure IT cost could be allocated to the business unit 542 and/or to the user 540. In such an instance, that non-infrastructure IT cost could be allocated down to the virtual desktops 538-1, 538-2. Such a downward allocation can be helpful when the desired output is the total cost of a virtual desktop. The true cost of the virtual desktop includes the cost of the virtual desktop itself (e.g., any non-infrastructure IT cost associated therewith), downstream infrastructure costs (e.g., the infrastructure IT costs of the VCIs that are used by the virtual desktop), and the non-infrastructure IT costs that are required for a user to be able to use the virtual desktop. Such an assessment can be made for any node in the service graph 550. That is, in response to the API query from the IT service application, the IT cost application can use the data from the query to create a cost report and respond to the query accordingly.

Figure 6:
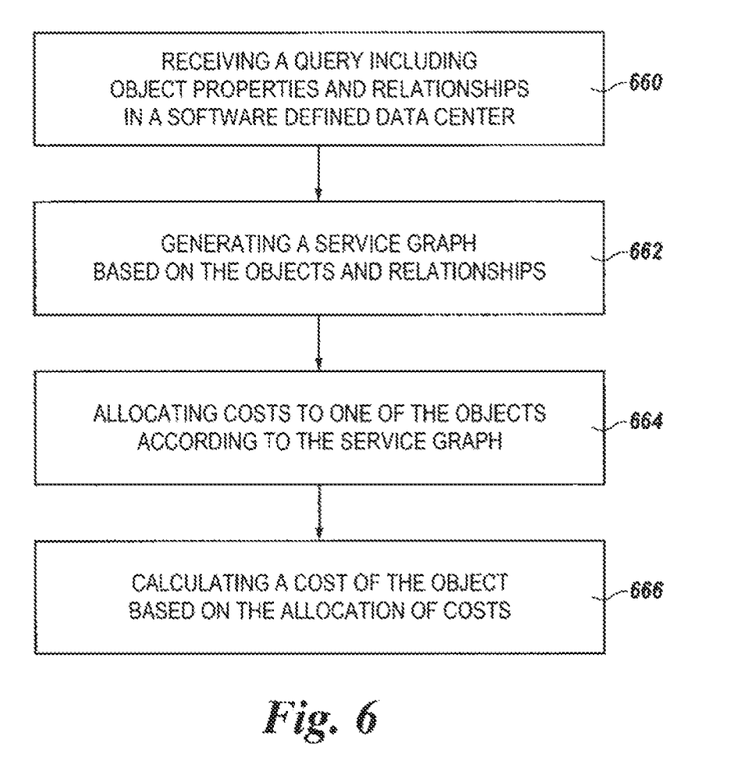
FIG. 6 is a flow chart illustrating a number of methods for IT cost calculation according to a number of embodiments of the present disclosure.

FIG. 6 is a flow chart illustrating a number of methods for IT cost calculation according to a number of embodiments of the present disclosure. At 660 the method can include receiving, at an IT cost engine, an API query. The query can include definitions of non-infrastructure IT objects including properties of the non-infrastructure objects and definitions of relationships between the non-infrastructure IT objects and infrastructure IT objects in a software defined data center. The API query can be specific to the IT cost engine and generic to a source of the API query (e.g., a source such as a IT service engine). This means that the query includes the specific information that the IT cost engine uses to calculate IT costs, but it does not mean that the query is in a format specific to the IT cost engine or tailored to the IT cost engine. The query itself is generic to the source of the query. That is, essentially the same query could have come from any application that desires to receive IT cost information from the IT cost engine. Such a query can include information from the source of the query in a generic form so that the IT cost engine can use the information without special programming for each possible source. As described herein, the method does not include the IT cost engine fetching definitions of the non-infrastructure IT objects nor does the method include the IT cost engine fetching definitions of the relationships. Such information can be provided with the query without being requested by the IT cost engine. At 662 the method can include generating a service graph based on the definitions of the non-infrastructure IT objects and the definitions of the relationships (e.g., as illustrated and described with respect to FIG. 5).

At 664 the method can include allocating an infrastructure IT cost and a non-infrastructure IT cost to one of the non-infrastructure IT objects according to the service graph. For example, the allocation can include allocating a cost of a VCI to the one of the non-infrastructure IT objects (e.g., a virtual desktop) that uses the VCI. Allocating the non-infrastructure IT cost can include allocating a service charge to the one of the non-infrastructure IT objects. As another example, allocating the infrastructure IT cost can include allocating a cost of a memory resource to the one of the non-infrastructure IT objects (e.g., a user), such as is illustrated in FIG. 5, The method can include allocating the non-infrastructure IT cost according to the service graph in consideration of the properties (e.g., properties such as service tier, quality of service, and resource utilization). For example, a higher service tier, a greater quality of service, and/or more resource utilization can lead to a relatively increased allocation of the cost versus a lower service tier, a lesser quality of service, and/or less resource utilization attributable to the non-infrastructure IT objects.

At 666, the method can include calculating a cost of the one of the non-infrastructure IT objects based on Me allocation of costs. Calculating the cost of the one of the non-infrastructure IT objects can include calculating the cost of the one of the non-infrastructure IT objects over time.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing, on its own as a separate embodiment.

What is claimed is:

1. A non-transitory machine-readable medium storing instructions executable by a processing resource to cause a computing system to:
   extract, from a plurality of application program interface (API) queries received from an information technology (IT) service engine without being requested, definitions of a plurality of non-infrastructure IT objects comprising a plurality of virtual desktops and definitions of relationships between the plurality of non-infrastructure IT objects and a plurality of infrastructure IT objects in a software defined data center, the infrastructure IT objects comprising a plurality of virtual computing instances (VCIs);
   generate a service graph that changes mappings over time within a cost allocation cycle based on the definitions extracted from the API queries during runtime of the infrastructure IT objects, wherein the service graph changes from a first mapping that relates a virtual desktop to usage of a first subset of the VCIs for a first portion of the cost allocation cycle, to a second mapping that relates the virtual desktop to usage of a second subset of the VCIs for a second portion of the cost allocation cycle;
   allocate an infrastructure IT cost to the virtual desktop based on: a portion of a first infrastructure cost of the first subset of the VCIs according to the first mapping, and a portion of a second infrastructure cost of the second subset of the VCIs according to the second mapping;
   allocate a non-infrastructure IT cost to the virtual desktop; and
   calculate a total cost of the virtual desktop based on the allocations.

2. The non-transitory machine-readable medium of claim 1, including instructions to:
   map the first subset of the VCIs to the virtual desktop and to a different IT service construct over time within the cost allocation cycle; and
   allocate a different portion of the first infrastructure cost of the first subset of the VCIs to the different IT service construct for the cost allocation cycle.

3. The non-transitory machine-readable medium of claim 2, wherein the instructions to allocate the non-infrastructure IT cost comprise instructions to:
   allocate another non-infrastructure IT cost to the different IT service construct; and
   wherein the non-infrastructure IT cost comprises a service charge for the different IT service construct.

4. The non-transitory machine-readable medium of claim 1, including instructions to map the infrastructure IT objects to the non-infrastructure IT objects over time;
   wherein the non-infrastructure IT objects include the virtual desktop and at least one of a user and a business unit; and
   wherein the infrastructure IT objects further include a virtual disk and a virtual network appliance.

5. A method for information technology (IT) cost calculation, comprising:
   receiving, at an IT cost engine, a plurality of application program interface (API) queries without the IT cost engine requesting the API queries, wherein the API queries include:
      definitions of a plurality of non-infrastructure IT objects including properties of the plurality of non-infrastructure IT objects; and
      definitions of relationships between the plurality of non-infrastructure IT objects and a plurality of infrastructure IT objects in a software defined data center, the infrastructure IT objects comprising a plurality of virtual computing instances (VCIs), wherein the definitions of relationships are received by the IT cost engine during runtime of the infrastructure IT objects;
   generating a service graph that changes mappings over time within a cost allocation cycle based on the definitions extracted from the API queries, wherein the service graph changes from a first mapping relates a virtual desktop to usage of a first subset of the VCIs for a first portion of the cost allocation cycle, and to a second mapping that relates the virtual desktop to usage of a second subset of the VCIs for a second portion of the cost allocation cycle;
   allocating an infrastructure IT cost to the virtual desktop based on: a portion of a first infrastructure cost of the first subset of the VCIs according to the first mapping, and a portion of a cost of the second subset of the VCIs according to the second mapping;
   allocating a non-infrastructure IT cost to the virtual desktop; and
   calculating a cost of the virtual desktop based on the allocation of costs.

6. The method of claim 5, wherein receiving the API queries comprises receiving an API query that is specific to the IT cost engine and generic to a source of the API query.

7. The method of claim 5, wherein receiving the API queries comprises receiving the API queries from an IT service engine during the runtime of the infrastructure IT objects.

8. The method of claim 5, wherein the method includes the IT cost engine neither fetching the definitions of the plurality of non-infrastructure IT objects nor fetching the definitions of the relationships.

9. The method of claim 5, wherein allocating the infrastructure IT cost includes allocating a cost of the virtual computing instance (VCI) to the virtual desktop, wherein the virtual desktop uses the VCI.

10. The method of claim 9, wherein allocating the non-infrastructure IT cost includes allocating a service charge to the virtual desktop.

11. The method of claim 5, further comprising:
allocating a cost of a memory resource to a user.

12. The method of claim 5, wherein calculating the cost of one of the plurality of non-infrastructure IT objects comprises calculating the cost of the one of the plurality of non-infrastructure IT objects over time.

13. The method of claim 5, wherein the properties include at least one of the group of properties including service tier, quality of service, and resource utilization; and
wherein allocating the non-infrastructure IT cost comprises allocating the non-infrastructure IT cost according to the service graph in consideration of the properties.

14. A system, comprising:
a processor; and
a memory coupled to the processor, wherein the memory comprises:
an information technology (IT) management engine to provision a plurality of virtual computing instances (VCIs) using a pool of IT resources in a software defined data center;
an IT service engine to provision a plurality of IT service constructs using the plurality of VCIs; and
an IT cost engine to:
receive over time, application program interface (API) queries from the IT service engine without the IT cost engine requesting the API queries, the API queries comprising definitions of relationships between the plurality of IT service constructs and the plurality of VCIs;
generate a service graph that changes mappings over time within a cost allocation cycle based on the API queries, wherein the service graph changes over time from a first mapping that relates a virtual desktop to usage of a first subset of the VCIs for a first portion of the cost allocation cycle, and to a second mapping that relates the virtual desktop to usage of a second subset of the VCIs for a second portion of the cost allocation cycle; and
allocate an infrastructure cost to the virtual desktop based on: a portion of a first infrastructure cost of the first subset of the VCIs according to the first mapping, and a portion of a second infrastructure cost of the second subset of the VCIs according to the second mapping.

15. The system of claim 14, wherein the IT service engine is configured to send the definitions of relationships during runtime of the plurality of VCIs.

16. The system of claim 14, wherein the IT cost engine is configured to allocate a cost of a pool of infrastructure resources to the plurality of VCIs.

17. The system of claim 14, wherein the IT service engine is further configured to manage IT services including applications.

18. The system of claim 14, wherein the IT resources include compute, memory, and network resources in the software defined data center.

19. The system of claim 14, wherein the definitions of the relationships include at least one of a group of definitions of relationships including used-by/uses for a first portion of a month and used-by/uses for a second portion of a month.

20. The system of claim 14, wherein the IT cost engine responds to a respective one of the API queries with a response comprising a cost report generated based on the infrastructure cost allocated to the virtual desktop and a service cost for the virtual desktop.

* * * * *